(12) United States Patent
Inverardi

(10) Patent No.: US 10,183,328 B2
(45) Date of Patent: Jan. 22, 2019

(54) METHOD AND APPARATUS FOR THE HEAT REGULATION OF A MOULD

(71) Applicant: IECI S.R.L., Passirano, Brescia (IT)

(72) Inventor: Mauro Inverardi, Brescia (IT)

(73) Assignee: IECI S.R.L., Passirano, Brescia (IT)

( * ) Notice: Subject to any disclaimer, the term of this patent is extended or adjusted under 35 U.S.C. 154(b) by 389 days.

(21) Appl. No.: 15/025,673

(22) PCT Filed: Sep. 23, 2014

(86) PCT No.: PCT/IB2014/064764
§ 371 (c)(1),
(2) Date: Mar. 29, 2016

(87) PCT Pub. No.: WO2015/049618
PCT Pub. Date: Apr. 9, 2015

(65) Prior Publication Data
US 2016/0243613 A1    Aug. 25, 2016

(30) Foreign Application Priority Data

Oct. 1, 2013 (IT) .............................. BS2013A0135

(51) Int. Cl.
*B22D 17/32* (2006.01)
*B22D 17/22* (2006.01)
*B29C 45/73* (2006.01)

(52) U.S. Cl.
CPC ......... *B22D 17/32* (2013.01); *B22D 17/2218* (2013.01); *B29C 45/73* (2013.01)

(58) Field of Classification Search
CPC ........................... B22D 17/2218; B29C 45/73
See application file for complete search history.

(56) References Cited

U.S. PATENT DOCUMENTS

| | | | |
|---|---|---|---|
| 4,976,305 A * | 12/1990 | Tanaka ............... | B22D 17/2218 164/154.4 |
| 6,763,879 B1 * | 7/2004 | Macheske .......... | B22D 17/2218 164/122 |
| 2013/0196015 A1 * | 8/2013 | Metsugi .............. | B29C 45/7306 425/144 |

(Continued)

FOREIGN PATENT DOCUMENTS

| EP | 1044744 A1 | 10/2000 |
|----|------------|---------|
| EP | 2537607 A1 | 12/2012 |

OTHER PUBLICATIONS

Heinrich et al., "Stabiler Wärmehaushalt in der Druckgießform", Giesseri, vol. 97, No. 10, pp. 60-62 (Year: 2010).*

(Continued)

*Primary Examiner* — Kevin E Yoon
(74) *Attorney, Agent, or Firm* — MacMillan, Sobanski & Todd, LLC

(57) ABSTRACT

A method of heat regulation of a mold comprises the steps of: providing a pump suitable to introduce a heat regulation fluid into the mold;—setting a set point pressure for said heat regulation fluid, said set point pressure being chosen so as to make the pump operate at maximum efficiency;—detecting the pressure drop of the circuit in which the heat-regulation fluid circulates;—performing feedback control of the pump pressure so as to annul the difference between said set-point pressure and said pressure drop.

7 Claims, 3 Drawing Sheets

(56) References Cited

U.S. PATENT DOCUMENTS

2013/0233504 A1* 9/2013 Penocchio ......... B22D 17/2218
164/348

OTHER PUBLICATIONS

Google machine translation of Stabiler Wärmehaushalt in der Druckgießform (Year: 2010).*
EPO machine translation of EP 2537607 (Year: 2012).*
Heinrich, et al., The Heart of The Die, Thermo-Temperature Control System: Control Unit With Temperature Sensor (Above), Flow Sensor (Middle) And Valve As Control Size (Control Valve, Below), pp. 1-4.
International Search Report and the Written Opinion, Application No. PCT/IB22014/064764 filed Sep. 23, 2014, dated Jan. 27, 2015.
PCT International Preliminary Report on Patentability, Application No. PCTIB2014/064764 filed Sep. 23, 2014, dated Feb. 11, 2016.
Written Opinion, Application No. ITBS20130135, dated Oct. 1, 2013.
Yang, Thermal Analysis Of Casting Dies With Local Temperature Controller, Int. J. Adv. Manuf. Technol (2007) 33: pp. 277-284.

* cited by examiner

METHOD AND APPARATUS FOR THE HEAT REGULATION OF A MOULD

This is a national stage application filed under 35 U.S.C. § 371 of international application PCT/IB2014/064764, filed under the authority of the Patent Cooperation Treaty on Sep. 23, 2014, published; which claims the benefit of Patent Application No. BS2013A000135, filed on Oct. 1, 2013. The entire disclosures of all the aforementioned applications are expressly incorporated herein by reference for all purposes.

The present invention relates to a heat regulation method of a mould, in particular a mould for die casting, and a heat regulation apparatus suitable for implementing such method.

As known, in order to function properly a mould needs to be brought to a defined temperature before each moulding cycle and to be cooled down at the end of each moulding cycle. For this purpose, each mould is provided with channels in which heat regulation fluid, such as oil or water, is run.

The heat regulation fluid is circulated by a heat regulation apparatus which comprises a pump and heating and/or cooling means of the fluid, for example electric resistors and heat exchangers. The pump controls the supply of the fluid to the mould and the return of the fluid from the mould, closing a heat regulation circuit.

It is also known that the load curve of the heat regulation circuit, that is the curve of maximum efficiency of heat regulation, relates the pressure and the flow rate in a relation that can be approximated by the formula $$p = kv^x$$

where p is the pressure of the heat regulation fluid, k is a constant equal to 0.069, v is the flow rate and the exponent x varies typically between 1.5 and 2.

The characteristic operating curve of a pump is instead described by an almost linear relationship which relates the flow rate and the pump pressure. Based on this relationship, as the pressure increases the flow rate decreases.

The intersection of the two curves identifies the point at which the pump works at maximum efficiency.

Up to now, the heat regulation of a mould has been performed by acting on the flow rate of the heat regulation fluid. For example, if a heat peak needs to be removed from the mould the flow rate is increased to make a greater amount of fluid circulate. However an increase of the flow rate is accompanied by a corresponding increase in pressure, according to the aforementioned load curve.

An excessive increase in pressure, however, leads the pump to work in a situation of stress characterised by high pressures and low flow rates, to the point of generating harmful cavitation phenomena.

To overcome such a drawback, attempts have been made to move the operating point along the characteristic curve of the pump by introducing a by-pass hydraulic circuit which connects the supply circuit to the return circuit without passing through the mould. In practice, the by-pass circuit provides a venting channel making it possible to save the pump from risk of damage to the rotor due to cavitation.

Such expedient however makes the heat regulation circuit work in an operating point which no longer falls on the maximum efficiency curve, with consequent loss of efficiency and waste of energy. In fact, the energy used in heat regulation is only partially used for the heat regulation of the mould; part of the energy flowing in the by-pass circuit does not contribute to the energy transfer to the mould, despite the electric energy is unchanged.

The purpose of the present invention is to propose a heat regulation method and a relative apparatus which are able to overcome the aforementioned drawbacks of the prior art and which in particular make it possible to achieve effective and uniform heat regulation of a mould.

Such purpose is achieved by a heat regulation method according to claim 1 and with a heat regulation apparatus according to claim 8. The dependent claims describe preferred embodiments of the invention.

The characteristics and advantages of the heat regulation method and apparatus according to the invention will, in any case, be evident from the description given below of its preferred embodiments, made by way of a non-limiting example with reference to the appended drawings, wherein.

Figure 1:
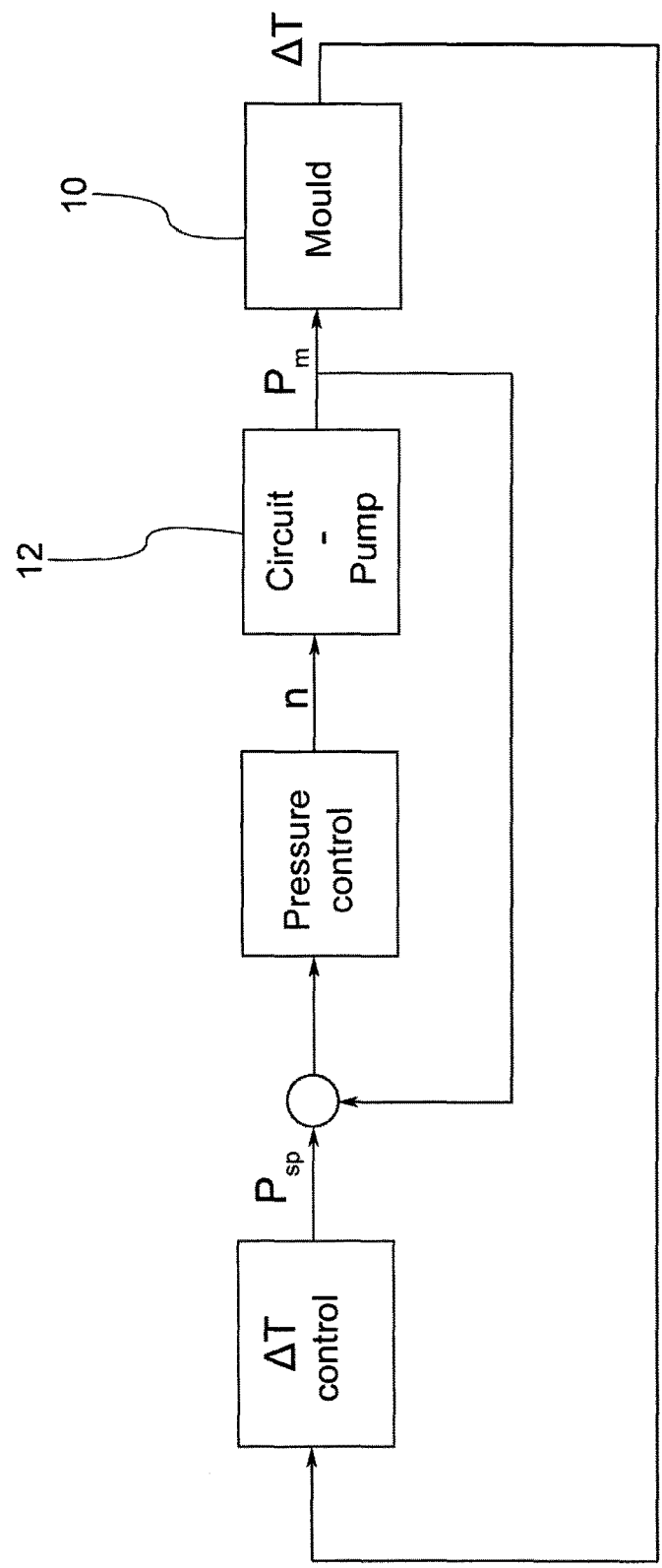
FIG. 1 is a block diagram of the heat regulation method according to the invention.

With reference in particular to FIG. 1, in a general embodiment, the heat regulation method of a mould 10 uses a pump 12 suitable to insert in the mould 10 a heat regulation fluid, such as oil or water. The heat regulation method provides for setting a set-point pressure $P_{sp}$ for said heat-regulation fluid, said set-point pressure being chosen so as to make the pump function at maximum efficiency. For example, said set-point pressure $P_{sp}$ is about 2.5 bar.

The heat regulation method further provides for detecting the pressure drop of the circuit in which the heat regulation fluid circulates and for performing a feedback control of the pressure of the pump 12 so as to cancel the difference between said pressure set-point and said pressure drop.

In the usual case of a non-pressurised mould, the pressure drop corresponds in fact to the supply pressure Pm of the heat regulation fluid in the mould.

In the case of a pressurised mould, the pressure drop will be equal to the difference between the supply pressure of the fluid to the mould and the return pressure of the fluid in output from the mould.

Circuit is taken to mean the path of the heat regulation fluid through the supply circuit which connects the pump to the mould, the return circuit which connects the mould to the pump, and the set of channels of the mould in which the fluid flows.

In practice, the pump can be electronically powered by an inverter, and the feedback control of the pressure of the pump comprises an adjustment of the number of revolutions n of the pump by means of said inverter, that is to say the speed of rotation of the motor is varied by adjusting the power supply frequency.

Consequently, according to one aspect of the invention, the set-point pressure Psp is maintained constant while the characteristic curve of the pump according to the real load demands of the circuit is adjusted. In other words, contrary to what is currently the case, it is the pump which adapts to the circuit and not vice versa.

Figure 2:
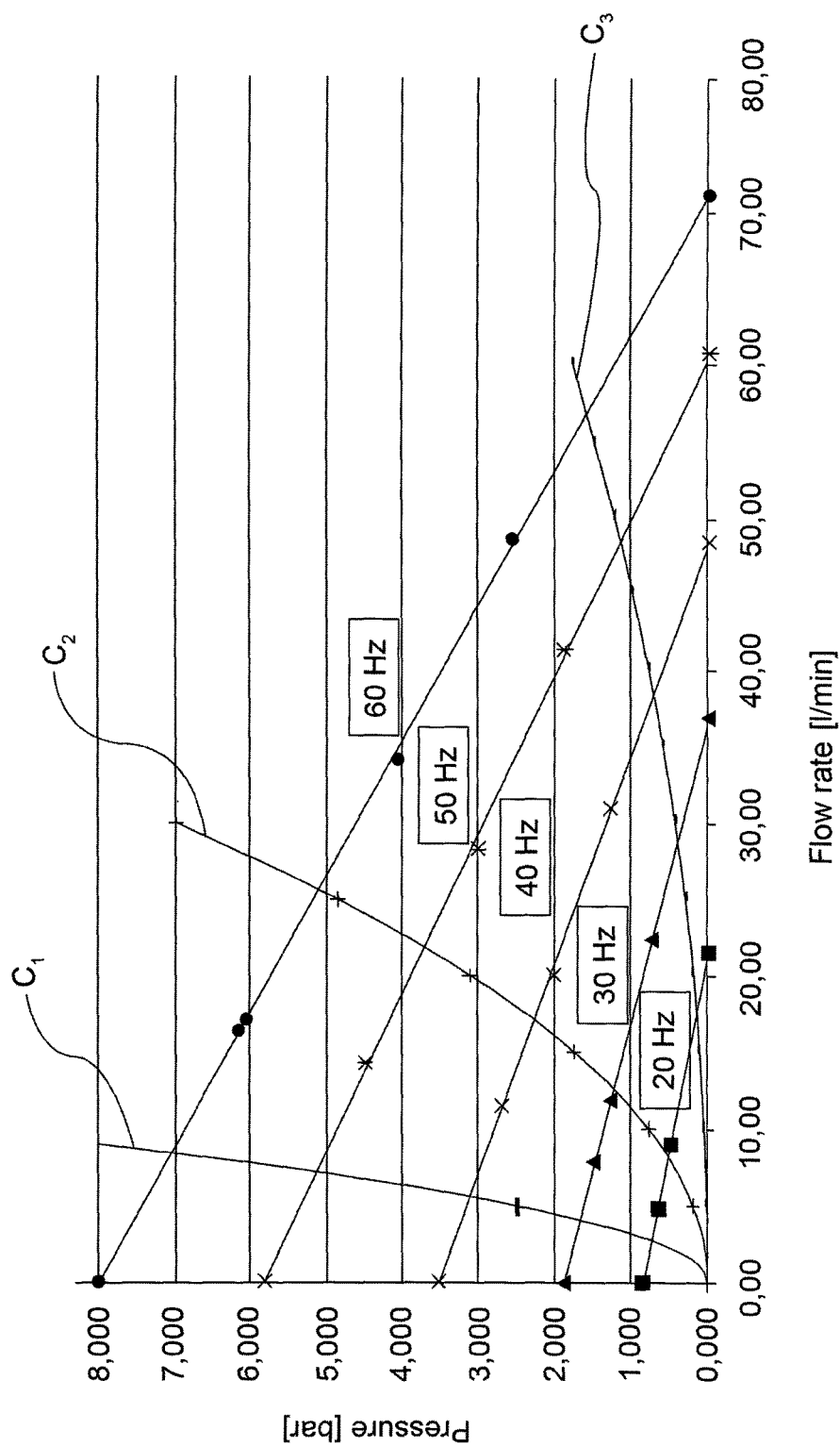
FIG. 2 shows a pressure-flow rate diagram relative to different load curves of a circuit and to a pump operating at different working frequencies.

An example of such adaptive control method, namely which adapts to the load curve of the circuit, is shown in the pressure-flow rate diagram of FIG. 2. In this diagram three load curves of the circuit, c1, c2, and c3 and the characteristic curve of a pump at different operating frequencies of the engine are shown. Having set a set point pressure Psp which allows the pump to work at maximum efficiency, depending on the load curve of the circuit which the pump is inserted in, the supply frequency of the pump motor is varied in such a way that the pump curve at that power supply frequency intercepts the load curve at the set point pressure Psp.

If the load curve of the circuit were to change, for example because of an obstruction, detection means of the pressure drop of the circuit detect such change and the power supply frequency of the pump motor is adjusted accordingly so as to shift the characteristic curve of the pump. In this way, the new curve of the circuit and the characteristic curve of the pump at the new rotation speed of the motor continue to intersect at a pressure value corresponding to the set-point pressure.

Should a heat exchange with the mould be demanded to the heat regulation circuit which is more significant than that obtainable with the fluid at the flow rate corresponding to the set-point pressure on the load curve of the circuit, for example during the transients, the external control loop in the control diagram in FIG. 1 comes into play, based on the monitoring of the temperature difference ΔT between the flow temperature of the incoming fluid to the mould and the return temperature of the fluid outgoing the mould.

As will be described below, such a control algorithm is based on the concept that, beyond a certain flow rate of the heat transfer fluid, the quantity of heat exchanged between the fluid and the mould no longer depends on the flow rate, but on the temperature of the fluid.

In fact, if T1 is the flow temperature of the heat regulation fluid, T2 is the return temperature, m the mass flow rate and q the exchanged thermal power, and $C_p$ the specific heat:

$$q=C_p*m*(T2-T1)=C_p*m*\Delta T$$

In a simplified lumped element mode of the mould, in which $R_{SC}$ is defined as the resistance of heat exchange between the mould and the channels, $R_{CF}$ the resistance of heat exchange between the channels and the heat regulation fluid and $R_{CA}$ the resistance of heat exchange between the channels and the environment, and in which a mould temperature Ts, uniform and constant in time, is assumed, then:

$$q=q_0-T_F/R_F.$$

where $$R_F=R_{CF}+R_{SC}/R_{CA}e$$

$$T_F=(T_1+T_2)/2$$

broken down:

$$q=[2*m*c_p/(2*m*c_p*R_F-1)]*(R_F+q_0-T_1)$$

if $2*m*c_p*R_F>>1$ then $$q \approx q_0-T_1/R_F$$

that is, the thermal power removed from the mould does not depend on the flow rate.
The condition $$m>>1/(2*c_p*R_F)$$

defines a condition of proper heat regulation.
Approximating RF to RSF and assuming that the cooling channels of the mould are designed properly, this condition may be rewritten as:

$$\Delta T<<T_S-T_1$$

In practice and with a good approximation the condition is met when:

$$\Delta T \leq (T_S-T_1)/5$$

For example, $T_S=350°$ C., $T_1=150°$ C., $\Delta T \leq 40°$ C. Consequently, in conditions of proper heat regulation:

- the temperature of the mould depends essentially on the temperature of the fluid and not of the mould;
- the temperature difference between supply and return is small, so uniformity of temperature on the channels is achieved;
- monitoring the temperature difference between supply and return is sufficient to ensure the condition of proper heat regulation.

In other words, if $\Delta T \leq (T_S-T_1)/5$, or is equal to or below a predetermined temperature value, for example in a range between 10° C. and 40° C., it means that the flow rate of fluid is sufficient to ensure proper heat regulation; if instead the temperature difference ΔT exceeds this threshold temperature value then the pressure and thus the flow rate need to be increased.

According to a further aspect of the invention, the heat regulation method provides for detecting the flow temperature of the heat regulation fluid in the mould and for detecting the return temperature of the heat regulation fluid in output from the mould. If the difference in temperature ΔT between the return temperature and the flow temperature exceeds a predefined threshold value, calculated as described above, the set-point pressure value Psp is modified so as to bring said temperature difference below the threshold value.

In other words, in the case of said threshold temperature value being exceeded, the pump is commanded to increase the pressure and thus the flow rate of the heat-regulation fluid so as to bring the temperature difference back under said temperature threshold value.

In this case, the characteristic curve of the pump translates upwards without the working point moving away from the load curve of the circuit, thus ensuring even in this case maximum efficiency of heat regulation.

Figure 3:
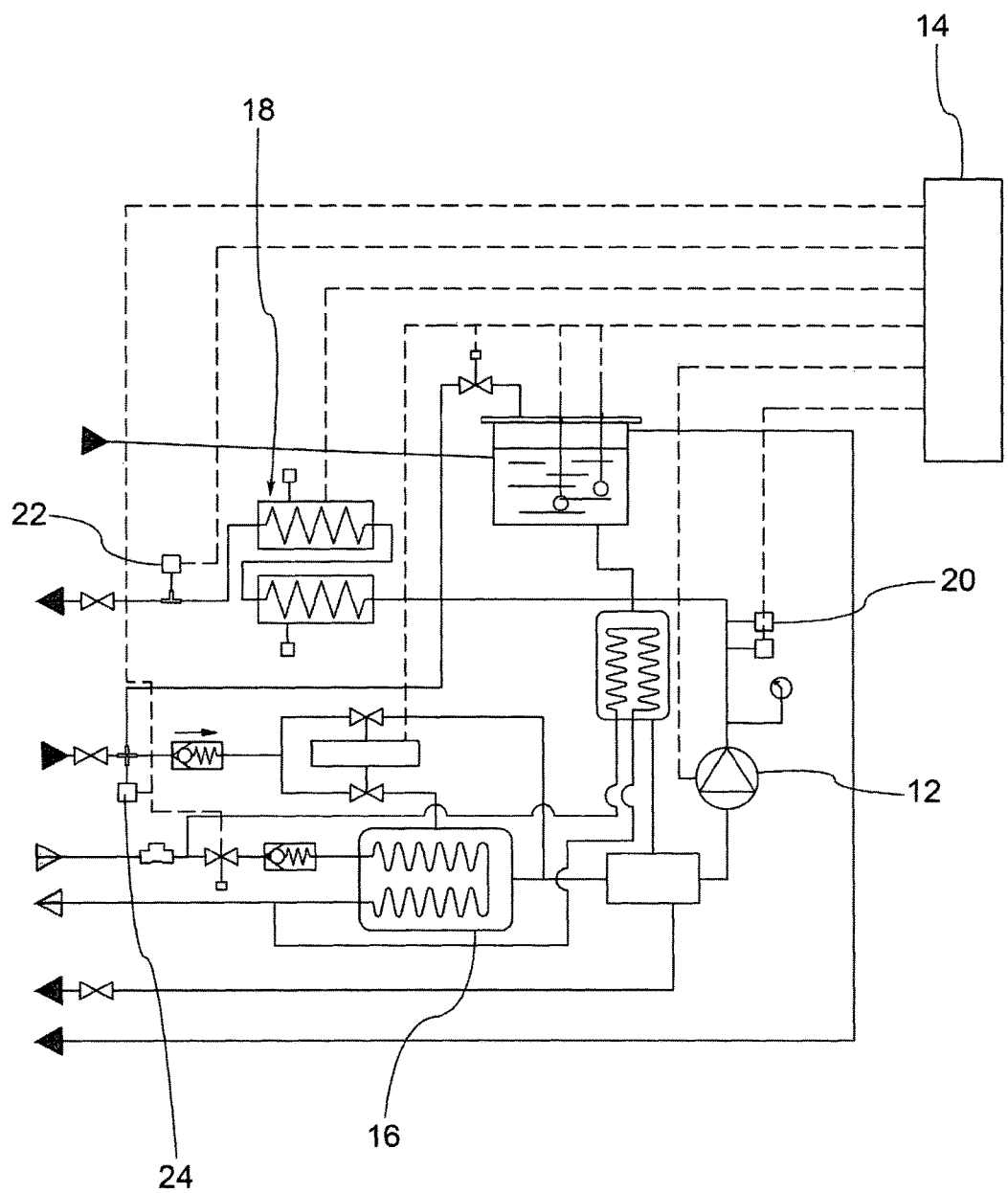
FIG. 3 is a hydraulic scheme of a heat regulation apparatus according to the invention.

FIG. 3 shows an embodiment of an apparatus which implements the heat regulation method described above.

The apparatus comprises a pump 12 for the supply of a heat regulation fluid to the mould and an electronic control unit 14 of the pump 12, for example a PLC. In one embodiment, the control unit acts on an inverter which powers the motor of the pump, controlling the power supply frequency according to the algorithm described above.

The apparatus further comprises cooling means 16 of the heat regulation fluid, preferably placed along the return circuit which connects the mould to the pump and made for example with an oil-water heat exchanger.

The apparatus further comprises heating means 18 of the heat regulation fluid, preferably placed along the return circuit which connects the pump 12 to the mould 10 and made for example with electrical resistances.

The apparatus further comprises detection means 20 of the pressure drop of the circuit in which the heat regulation fluid flows and means for detecting the supply flow 22, 24 of the fluid and return temperature of the fluid, respectively.

As may be seen, there is no by-pass circuit.

A person skilled in the art may make modifications and variations to the embodiments of the heat regulation method and apparatus according to the invention, replacing elements with others functionally equivalent so as to satisfy contingent requirements while remaining within the sphere of protection of the following claims. Each of the characteristics described as belonging to a possible embodiment may be realised independently of the other embodiments described.

The invention claimed is:
1. Method of heat regulation of a mould, comprising the steps of:

providing a pump suitable to introduce a heat regulation fluid into the mould;

setting a set-point pressure for said heat-regulation fluid, said set-point pressure being chosen in such a way as to make the pump function at maximum efficiency;

detecting pressure drop of a circuit in which the heat-regulation fluid circulates;

performing feedback control of the pump pressure so as to annul the difference between said set-point pressure and said pressure drop.

2. Method according to claim 1, wherein said pressure drop of the circuit corresponds to a supply pressure of the heat regulation fluid to the mould.

3. Method according to claim 1, wherein the pump is powered by an inverter, and wherein said feedback control of the pump pressure comprises a regulation of numbers of revs of the pump by means of said inverter.

4. Method according to claim 1, comprising the steps of:

detecting a supply temperature of the heat regulation fluid in the mould;

detecting a return temperature of the heat regulation fluid in output from the mould;

if the difference in temperature between the return temperature and the supply temperature exceeds a predefined threshold value, modifying the set-point pressure value so as to bring said temperature difference below said threshold value.

5. Method according to claim 4, wherein, having defined said threshold temperature value as $\Delta T$, then $$\Delta T \le (TS-T1)/5$$

where Ts is the temperature of the mould to be heat-regulated and T1 is the flow temperature of the heat regulation fluid.

6. Heat regulation apparatus of a mould, comprising:

a pump for supply of a heat regulation fluid to the mould;

an electronic control unit of the pump;

cooling means and/or heating means of the heat-regulation fluid;

detection means of pressure drop of the circuit in which the heat-regulation fluid circulates;

detection means of flow temperature of the fluid and of return temperature of the fluid, wherein said electronic control unit is programmed to actuate a heat-regulation method according to claim 1.

7. Apparatus according to claim 6, wherein the pump is electronically powered by an inverter controlled by said electronic control unit.

* * * * *